(No Model.) 2 Sheets—Sheet 1.
B. SAMUELS.
ELECTRIC RAILWAY SIGNAL.
No. 521,553. Patented June 19, 1894.
Fig. 1.
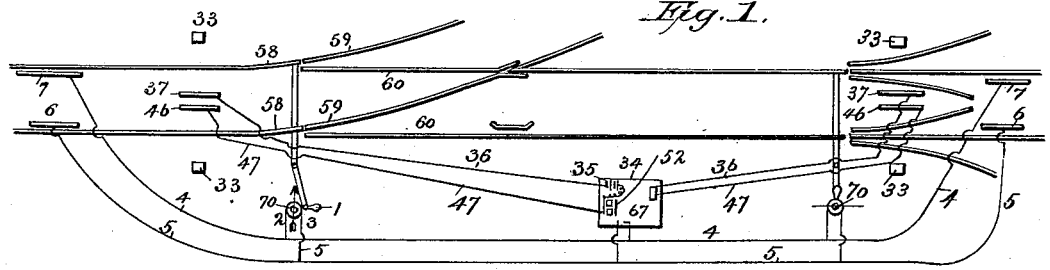
Fig. 4.
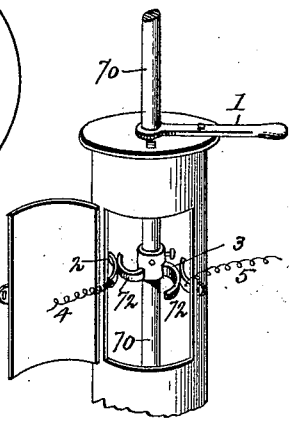
Fig. 3.
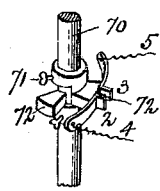
Fig. 6.
Fig. 7.
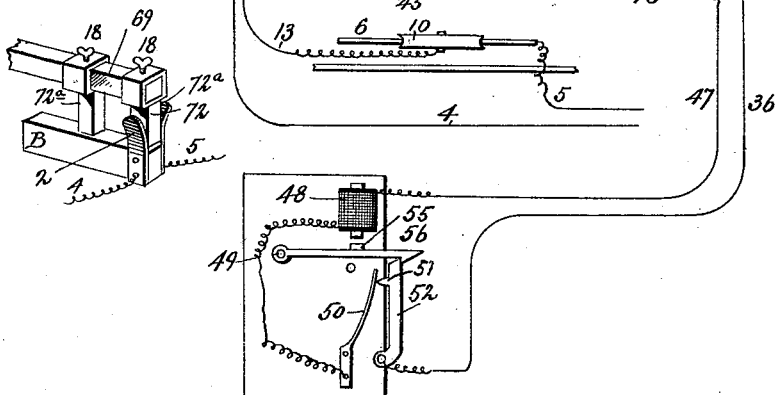
WITNESSES
Franck L. Ouraud
L. O. Bond
INVENTOR:
Barney Samuels.
by J. Fred Keily
his Attorney
THE NATIONAL LITHOGRAPHING COMPANY,
WASHINGTON, D. C.

(No Model.) 2 Sheets—Sheet 2.
B. SAMUELS.
ELECTRIC RAILWAY SIGNAL.

No. 521,553. Patented June 19, 1894.

WITNESSES
F. L. Ourand
L. O. N. Bond

INVENTOR
Barney Samuels.
by J. Fred V. Reily,
his Attorney

UNITED STATES PATENT OFFICE.

BARNEY SAMUELS, OF ST. JOSEPH, MISSOURI.

ELECTRIC RAILWAY-SIGNAL.

SPECIFICATION forming part of Letters Patent No. 521,553, dated June 19, 1894.

Application filed July 26, 1893. Serial No. 481,562. (No model.)

*To all whom it may concern:*

Be it known that I, BARNEY SAMUELS, a citizen of the United States, residing at St. Joseph, in the county of Buchanan and State of Missouri, have invented certain new and useful Improvements in Electric Railway-Signals; and I do declare the following to be a full, clear, and exact description of the invention, such as will enable others skilled in the art to which it appertains to make and use the same, reference being had to the accompanying drawings, and to the figures and letters of reference marked thereon, which form a part of this specification.

This invention relates to electrically operated signaling devices for railways, whereby the engineer of the moving train will automatically receive a warning signal apprising him of the condition of the road ahead. This signal may be either visual or audible, or both, and will be produced by the closing of an electric circuit by the moving train. The signaling mechanism may be conveniently located on the moving train, preferably in the cab of the engineer.

The objects of the invention are,—first, to construct and dispose the signaling devices so that practically it will be impossible for a train to run into an open switch or turnout without those in charge of the said train automatically receiving a timely warning to avert the danger; second, to construct the circuit closing devices so that any turnout may be readily used as a main line, the change being produced by a duly authorized person; third, to produce a simple system whereby switches, yards, stations, and other dangerous places may be cheaply equipped with efficient and reliable signaling instrumentalities; and obviate the use of insulated rails of great length which are costly and troublesome.

My invention consists in the novel features and the peculiar construction and combination of the mechanisms which will be hereinafter more fully set forth, and claimed, and which are shown in the annexed drawings, in which—

Figure 2:
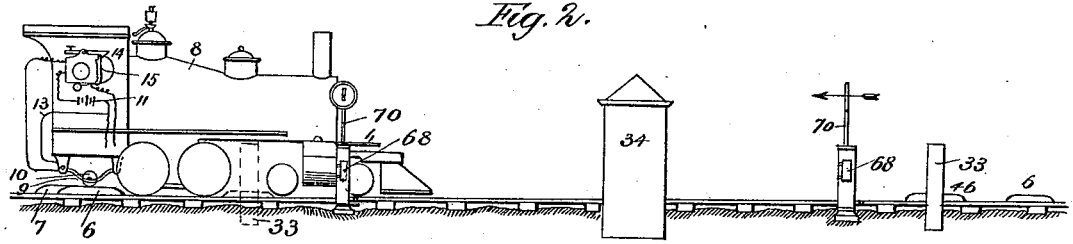
Figure 5:
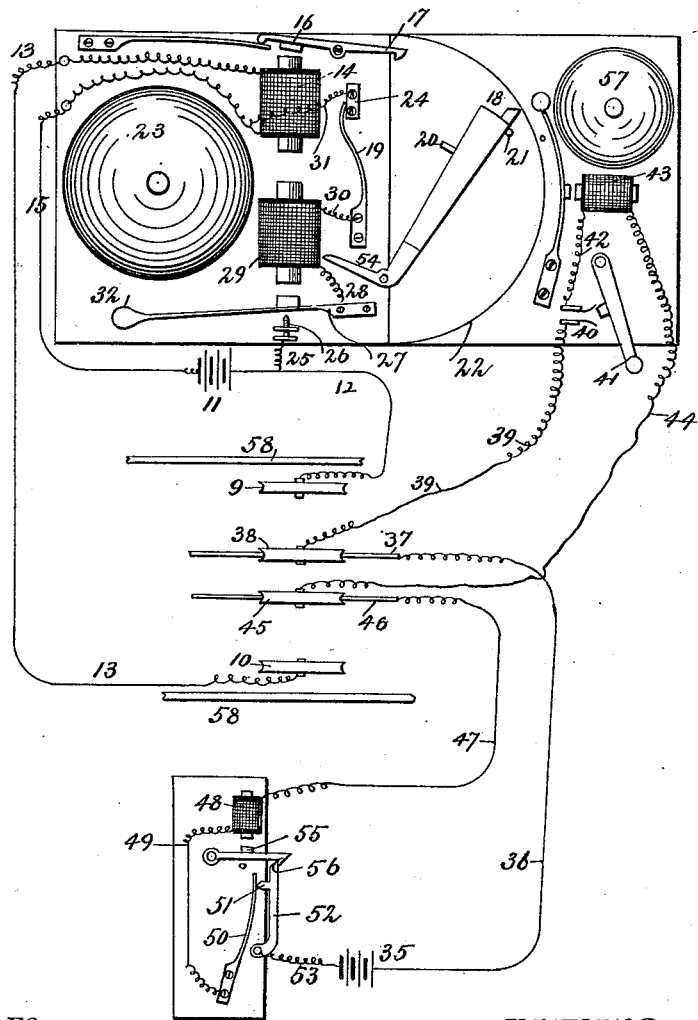

Figure 1 is a plan view of a section of main and switch lines of railway track showing the sets of short rail contacts and the electrical connections. Fig. 2 is a side elevation of the parts seen in Fig. 1, showing a portion of a train in position to receive a signal and showing the signal mechanism in the cab of the locomotive. Fig. 3 is an enlarged perspective view of part of a switch-stand and its electrodes. Fig. 4 is a detail view of the signaling instrumentalities showing the parts operatively related, and the electrical connections. Fig. 5 is a similar view showing a modification of the mechanism for transmitting orders to the detained train from a tower or other point of observation. Fig. 6 is a detail view of a portion of the switch operating rod designed for a three throw switch stand. Fig. 7 is a modified form of circuit closer, used when the switch rod has a straight line movement.

The same letters and numerals of reference indicate corresponding parts in the several figures.

The invention while especially designed for general application on railways, may, with slight changes which will readily suggest themselves to those skilled in the art, be adapted for use in connection with draw bridges and block systems on railways, and in other positions where it may be desirable to automatically warn moving cars or vehicles of impending danger.

In Fig. 1, the main and turnout tracks are represented by the numerals 60 and 59, respectively, the switch by 58, and the short contact rails by 6, 7, and 37, 46. There may be as many turnouts 59 as required, and the same are designed to be used as a continuation of the main track by adjusting the circuit closer on the switch operating rod to the proper position, which result is produced by the duly authorized person in the manner which will be hereinafter more fully described. The tower 34 is located at a convenient point and is provided with a battery or other current generator 35, and with electric appliances substantially as shown at the bottom of Figs. 4 and 5, consisting of an electro-magnet 48, armature 55, pivoted latch or hook 56, drop arm 52 having projection 51, and spring arm 50. A switch 67 is also provided in the tower 34 to close the circuits 4 and 5 having the short rail contacts 6 and 7 as terminals. A switch stand A, one being provided for each switch, and operatively connected therewith in the usual manner, is closed by a door 68 which is locked, the key being carried by the proper person, and has the switch operating rod 70 actuated by means of the lever 1. Contacts, 2 and 3, electrically insulated from the stand but supported thereby, form terminals of the conductors 4 and 5. A circuit closer, comprising oppositely curved arms 72 forming the letter S, is adjustable on the rod 70, being held thereon by the binding screw 71, and is adapted to make electrical connection with the said contacts 2 and 3 and close the circuit through the conductors 4 and 5 to produce the signal when the moving train completes the circuit through the contact rails 6 and 7 as shown in Figs. 2 and 4.

The signaling apparatus will be conveniently located on the train, being preferably placed on the locomotive as indicated in Fig. 2, and consists of a release electro magnet 14, latch lever 17 carrying armature 16 and operated on by a spring $a$, gong 23, electro-magnet 63, Fig. 4; electro magnet 29, Fig. 5; signal arm 18 having projection 20, white background 22 to display the arm 18 prominently when the same drops, being limited in its movement by the stop 21 on the back-ground 22, which is a semi-circular dial painted white. As shown in Fig. 4 the arm 18 has connected therewith a hammer 61 to strike the gong 23 to produce an audible signal at the same instant the visual signal 18 is displayed. A contact plate 24 forms one terminal of the electro-magnet 63 and the other terminal is electrically connected with one pole of a battery or current generator 11 on the train by means of the conductor 62. The spring contact 19 adapted to make electrical connection with the plate 24 and normally held out of contact therewith by the projection 20, is electrically connected with a contact 45 on the train by means of the conductor 65, a similar contact 38 being in electrical connection with the opposite pole of the battery 11 through the conductors 66, 12. The contacts 38 and 45 are wheels which are suitably attached to the locomotive so as to make electrical connection with the short rails 37 and 46 arranged farther from the approaching train than the short contact rails 6 and 7, the train passing the latter before reaching the rails 37 and 46. Other contacts 9 and 10 are provided on the train similar to the rolling contacts 38 and 45. One terminal of the release magnet 14 is connected through conductor 13 with the conductor 10, the other with one pole of the battery 11 by means of the conductor 15. The contact 9 is in electrical connection with the other pole of the battery through the conductor 12. When the train reaches a point so that the contacts 9 and 10 make electrical connection with the short rails 6 and 7, the circuit is established through the electro magnet 14 which attracts the armature 16 and releases the arm 18 which drops and constitutes the visual signal. The movement of this arm brings the hammer 61 in contact with the gong 23 and at the same time produces an audible signal to give warning of impending danger. At the instant the arm 18 drops the spring contact 19 being released from the influence of the projection 20 makes electrical connection with the contact plate 24. The train moves to a point so that the rolling contacts 38 and 45 make electrical connection with the short rails 37 and 46 the position being determined by posts or other indicating means 33 located on the side of the track opposite the short rails 37 and 46. The train remains in this position until orders are received to go ahead. The rails 37 and 46 are in electrical connection with the drop arm 52 and electro-magnet 48 through the conductors 36 and 47, and the spring contact 50 is electrically connected through the conductor 49 with the said magnet 48. By operating the arm 52 as a telegraph key any message through a prearranged code of signals may be transmitted to the train through the gong 23. On making and breaking the circuit through the arm 52 the magnet 63 will be magnetized and demagnetized and will operate the hammer to sound the gong. When the arm 18 is replaced the projection 20 engaging with the spring contact 19 will interrupt the alarm circuit.

A slightly different arrangement is shown in Fig. 5, in which the plate 24 is connected with one pole of battery 11 through conductors 31 and 15, and the spring contact 19 is connected with one terminal of electro-magnet 29 through conductor 30, the other terminal of the said electro-magnet 29 being connected with a vibrating hammer 32 having armature 27. An adjustable contact 26 is connected with the other pole of battery 11 through conductors 25, 12. When the visual signal is displayed the local circuit is closed and the gong 23 continuously sounded until the visual signal 18 is replaced or returned to a normal position, when the projection 20 pressing against the spring 19 will break the local circuit and cause the gong to cease ringing. A separate ordering signal is provided to transmit signals from the tower to the train and consists of a gong 57, single stroke hammer 42, magnet 43, split switch 40, key 41 for closing switch 40, and conductors 44, 39, and 42 connecting the magnet 43 with the roller contacts 45 and 38 and with the parts of the switch 40. When the engineer on the train closes the switch 40 after reaching a position so that the contacts 38 and 45 are in electrical connection with the short rails 37 and 46 the circuit is closed through the mechanism 52, 51, &c., in the tower, and by using the arm 52 telegraphically an order or message can be transmitted to the engineer in the manner herein set forth.

The construction shown in Fig. 6 is for a three throw switch, the arms 72 being separate and having independent adjustable connection with the rod 70, being held thereon by binding screws 71. The contacts 2 and 3 are brought close together so as to be closed by a single arm 72 substantially in the manner shown.

In Fig. 7 is shown a construction in which the rod 69 is the equivalent of the rod or shaft 70, and the contacts 72ª the equivalent of the arms 72, and are adjustably held on the rod 69 by binding screws 18; the contacts 2 and 3 being secured to a suitable support B. The contacts 72 can be adjusted on the rod or shaft 70 to make electrical connection with the contacts 2 and 3 and convert a turnout into a continuation of the main track when required for purposes of signaling to a train on the said turnout or switch.

To prevent short circuiting through the contacts 9 to 10 and 38 to 45 when the same make electrical connection with the terminals 6, 7, and 37, 46, the said contacts 9, 10, and 38, 45 are electrically insulated in any desired manner.

The separate ordering signal shown to the right in Fig. 5, being a modification, is actuated by means of the battery 35 in the tower when the circuit is closed in the manner herein set forth. In the event of the battery 35 being used in the system shown in detail in Fig. 4 the said battery 35 will supplement the action of the battery 11 on the train and insure the operation of the signal.

Having thus described my invention, what I claim, and desire to secure by Letters Patent, is—

1. In a train signaling mechanism, the combination of an audible and a visual signal carried by the train, electro-magnets for releasing and actuating the signals, circuit closing devices for causing the current to pass through the releasing magnet, and independent circuit closing devices to cause the current to pass through the magnet for operating the audible signal, substantially as set forth.

2. In a train signaling mechanism, the combination of an audible and a visual signal carried by the train, a releasing magnet to liberate the visual signal whereby the audible signal is sounded, a second magnet for operating the audible signal, independent circuit closing devices for the two sets of magnets, and independent sets of contact rails on the track bed for successively closing the respective circuits through the said magnets, substantially as specified.

3. In a train signaling mechanism, the combination of an audible and a visual signal carried by the train, independent magnets for actuating the signals, an automatic circuit closing device normally held open by the visual signal for closing the circuit through the magnet for operating the audible signal, and independent circuit closing devices for effecting communication between the train and the switch and station, substantially as described.

4. In a train signaling mechanism, a signal on the train, short rails to close the circuit and actuate the said signal, an order signal circuit closed by the alarm signal, a second set of short rails to establish the circuit between the train and the station, and a circuit closer under the control of the operator at the station to transmit orders to the engineer, substantially as set forth.

5. In a train signaling mechanism, the combination of an audible signal, a magnet for operating the audible signal, plate 24, spring 19, visual signal 18 for actuating the audible signal and normally holding the spring 18 out of electrical connection with the plate 24, catch 17, release magnet 14, and circuit closing devices, substantially as described, for sending the current through the said magnets, substantially as specified.

6. In a train signaling mechanism, the combination with a signal carried by the train, and circuit closing devices between the train and the station, of drop arm 52, spring 50, magnet 48 and catch 55, 56, substantially as described for the purpose specified.

7. In a train signaling mechanism, the combination of visual signal 18, an audible signal operated when the visual signal is exposed, catch 17, release magnet 14, a second magnet for sounding the alarm, contacts 9, 10 and 38, 45, short rails 6, 7 and 37, 46, conductors 4 and 5, circuit closing devices operated by the switch-operating mechanism, circuit closer 67 at the station, drop arm 52, spring 50, catch 55, 56 and magnet 48, whereby a visual and audible signal will be simultaneously actuated on the moving train, a visual signal at the station exposed, and the train put in electrical connection with the station to receive orders, substantially as set forth.

In testimony whereof I affix my signature in presence of two witnesses.

BARNEY SAMUELS.

Witnesses:
ADOLPH GOERMAN,
GEORGE W. HINTON.